United States Patent
Haustein et al.

(10) Patent No.: US 12,100,421 B1
(45) Date of Patent: Sep. 24, 2024

(54) MOUNTING MAGNETIC TAPES BASED ON LIFECYCLE METRICS AND END OF LIFE INDICATORS

(71) Applicant: International Business Machines Corporation, Armonk, NY (US)

(72) Inventors: Nils Haustein, Soergenloch (DE); Thorsten Altmannsberger, Wiesbaden (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 18/196,045

(22) Filed: May 11, 2023

(51) Int. Cl.
G11B 15/68 (2006.01)
G11B 5/78 (2006.01)
G11B 20/18 (2006.01)

(52) U.S. Cl.
CPC ........... G11B 15/689 (2013.01); G11B 5/78 (2013.01); *G11B 2020/1869* (2013.01)

(58) Field of Classification Search
None
See application file for complete search history.

(56) References Cited

U.S. PATENT DOCUMENTS

| | | | |
|---|---|---|---|
| 7,672,754 B1 | 3/2010 | Haustein et al. | |
| 9,959,892 B1 | 5/2018 | Miyamura et al. | |
| 2003/0016609 A1* | 1/2003 | Rushton et al. | G11B 27/36 360/60 |
| 2010/0265606 A1* | 10/2010 | Thompson et al. | G11B 15/689 360/15 |
| 2010/0321811 A1 | 12/2010 | Goberis | |
| 2018/0113619 A1 | 4/2018 | Kawamura et al. | |
| 2021/0255811 A1 | 8/2021 | Said et al. | |
| 2023/0016609 A1 | 1/2023 | Karathanasis et al. | |
| 2023/0092721 A1 | 3/2023 | Sumiya | |

FOREIGN PATENT DOCUMENTS

| | | |
|---|---|---|
| CN | 103064768 A | 4/2013 |
| JP | 2004133845 A | 4/2004 |

OTHER PUBLICATIONS

UK Search Report dated Sep. 29, 2023 from GB Patent Application Serial No. GB2304959.6 filed on Apr. 4, 2023.
GB Patent Application No. GB2304959.6 filed Apr. 4, 2023.

* cited by examiner

*Primary Examiner* — Craig A. Renner
(74) *Attorney, Agent, or Firm* — Aaron N. Pontikos (57) ABSTRACT

A computer-implemented method for optimizing a global lifetime for a plurality of magnetic tape cartridges for a magnetic tape library is disclosed. The computer-implemented method includes storing a magnetic tape cartridge lifecycle table for a set of parameter values. The set of parameter values include: volume serial numbers of the plurality magnetic tape cartridges, lifetime metric values of the plurality of magnetic tape cartridges, and end-of-life-indicator values for the plurality of magnetic tape cartridges. The computer-implemented method further includes selecting a magnetic tape cartridge from the plurality of magnetic tape cartridges based on the set of parameter values and a selection criteria, wherein the selection of the magnetic tape cartridge optimizes the global lifetime of the plurality of magnetic tape cartridges in the magnetic tape library.

20 Claims, 6 Drawing Sheets

| byte | bit 7 MSB | bit 6 | bit 5 | bit 4 | bit 3 | bit 2 | bit 1 | bit 0 LSB |
|---|---|---|---|---|---|---|---|---|
| 0 | operation code (X'3B') | | | | | | | |
| 1 | logical limit # | | | reserved | | 402, mode code | | |
| 2 | buffer ID (X'00') | | | | | | | |
| 3 | buffer offset | | | | | | | |
| 4 | | | | | | | | |
| 5 | | | | | | | | |
| 6 | 404, parameter list length | | | | | | | |
| 7 | | | | | | | | |
| 8 | | | | | | | | |
| 9 | vendor spec | | | 406, reserved (B'0000') | | | flag (B'0') | link (B'0') |

MOUNTING MAGNETIC TAPES BASED ON LIFECYCLE METRICS AND END OF LIFE INDICATORS

BACKGROUND

Field of the Invention

The invention relates generally to a method for optimizing an overall lifetime for a plurality magnetic tape cartridges, and more specifically, to a computer-implemented method for optimizing a global lifetime for a plurality magnetic tape cartridges for a magnetic tape library. The invention relates further to a related magnetic tape lifetime optimizing computer program product and computer system for optimizing a global lifetime for a plurality magnetic tape cartridges.

Related Art

The amount of data managed by IT (Information Technology) departments of enterprises as well as government institutions is ever-increasing. It also increases the burden of managing archives of historic data and data that may not be accessed very often. Magnetic tapes still provide a cost-effective way to retain an offload of continuously increasing volumes of data. The low cost per gigabyte and the low energy consumption can make magnetic tapes a preferred option over hard disk drives, optical drives and flash memory storage for infrequently accessed data (e.g., archived data). Thereby, the limited lifetime of the magnetic tapes—typically used in the form of magnetic tape cartridges-remains a critical parameter for an error-free operation of a tape library system. Such a system has been proven to be essential in managing a large amount of magnetic tape cartridges.

Tape library systems—also denoted as tape storage systems-typically comprise a server hosting one or more tape management applications that manage the data on the magnetic tape cartridges. The tape library system comprises typically a plurality of tape drives, a library controller and one or more robotic arms (i.e., accessors) in order to move selected magnetic tape cartridges from a rest position—i.e., cartridge slot—to a tape drive unit to read or write data. Traditionally, a magnetic tape cartridge may be uniquely identified by its volume serial number (so-called volser). In some cases, the volume serial number may be, e.g., an eight-character alphanumeric identifier that can be printed on a sticker and put on the magnetic tape cartridge housing. The sticker may also comprise a barcode encoding the unique volser in the selected tape library system. The unique volser can also be written to the magnetic tape—or in short, "tape"—together with other metadata of the magnetic tape cartridge.

Several technologies exist to manage a lifetime of a single magnetic tape cartridge. E.g., document U.S. Pat. No. 5,500, 802 B discloses an automated cartridge system which optimizes the time it takes to execute series of cartridge requests. After the cartridge request is received, the library controller determines the appropriate time it would take to execute each possible sequence of pending cartridge requests. The library controller then executes the first request in the sequence of pending requests which would take the shortest elapsed time. Furthermore, document U.S. Pat. No. 5,287, 459 B discloses access times in an automated library system with sequentially stored data on a recording tape medium. A multiplicity of copies of the stored data may exist in different tape cartridges. The copies in the original are stored in different areas of the library. Each data segment starts on the tape media from the original. Furthermore, the multiple copies are created or deleted independently of any user control. As a measure of improvement, the library manager selects the tape cartridge that can be retrieved in the shortest response time using the location of the original and the copies and more variables.

On the other side, there remains a need to optimize the total or global lifetime of all of the plurality of magnetic tape cartridges for the tape library system.

SUMMARY OF THE INVENTION

According to one aspect of the present invention, a computer-implemented method for optimizing a global lifetime for a plurality of magnetic tape cartridges for a magnetic tape library may be provided. The method may comprise storing a magnetic tape cartridge lifecycle table for a set of parameter values comprising volume serial numbers of the magnetic tape cartridges, lifetime metric values of the magnetic tape cartridges, and end-of-life-indicator values for each of the magnetic tape cartridges. Additionally, the method may comprise selecting a magnetic tape cartridge based on the set of parameter values and a selection criterion such that the global lifetime of the plurality of magnetic tape cartridges in the magnetic tape library is optimized.

According to another aspect of the present invention, a magnetic tape lifetime optimizing system for optimizing a global lifetime for a plurality magnetic tape cartridges for a magnetic tape library may be provided. The system may comprise one or more processors and a memory operatively coupled to the one or more processors, wherein the memory stores program code portions which, when executed by the one or more processors, enable the one or more processors to store a magnetic tape cartridge lifecycle table for a set of parameter values comprising volume serial numbers of the magnetic tape cartridges, lifetime metric values of the magnetic tape cartridges, and end-of-life-indicator values for each of the magnetic tape cartridges. Furthermore, the one or more processors may also be enabled to select a magnetic tape cartridge based on the set of parameter values and a selection criteria such that the global lifetime of the plurality of the magnetic tape cartridges in the magnetic tape library is optimized.

The proposed computer-implemented method for optimizing a global lifetime for a plurality magnetic tape cartridges for a magnetic tape library may offer multiple advantages, technical effects, contributions and/or improvements:

The concept proposed here may overcome the limitation of a traditional tape library system management dealing only with data of single magnetic tape cartridges. In fact, the lifetime of the magnetic tape cartridge is limited. Thereby, the use of the magnetic tape cartridges determines the lifetime of a magnetic tape cartridge. This is influenced by a couple of parameters, in particular, the number of times the tape cartridge has been loaded into a tape drive unit, the total number of bytes read and written, and the total distance the tape traveled across the read-write head of the magnetic drive unit.

The proposed concept here may overcome the shortcomings of traditional tape library system operations in that a different magnetic tape cartridge selection algorithms may be used that manages the access to the data in a way that the total or global lifetime of all magnetic tape cartridges within the tape library system is optimized, instead of just optimizing the lifetime of single magnetic tape cartridges.

Furthermore, a shortcoming of the prior art is that the tape cartridge lifecycle metrics and an end-of-life-indicator can only be queried when the magnetic tape cartridge is mounted in a tape drive. The newly proposed concept may use a tape cartridge life-cycle table in which a set of parameters is stored for each magnetic tape cartridge in the tape library system. Hence, this data may be used for a selection of a magnetic tape cartridge without requiring to read the metadata stored on the magnetic tape of the magnetic tape cartridge. A combination of one or more threshold values may be used for a comparison against the parameter values stored in the tape cartridge lifecycle table in order to determine a magnetic tape cartridge for the selected data. This concept may also work in environments where data is written in a redundant form to different magnetic tape cartridges in the tape library system.

In the following, additional embodiments of the inventive concept-applicable for the method as well as for the system-will be described.

According to a useful embodiment of the method, the lifetime metric values may comprise at least one value selected out of the group comprising a number of mount times, a number of bytes read, a number of bytes written, and a shortest distance the tape has traveled across a read/write-head of any of the drive units. These lifecycle metric parameters may represent a typical set of such parameters. Others parameter values may be added. Such parameter values may typically be written to the magnetic tape within the cartridge before the cartridge is unmounted from the tape drive unit.

According to an advantageous embodiment of the method, the selection criteria may comprise a condition or an expression further specifying the selection criteria. The expression may be a combination of different conditions for the different parameter values. This way, the global lifetime for the plurality of magnetic tape cartridges in the magnetic tape library or tape library system may be optimized according to different optimization aspects.

According to a permissive embodiment of the method, the selection criteria expression may comprise a comparison of a single tape cartridge lifetime metric value and/or an end-of-life indicator value against related threshold values. A simple example may be to select a magnetic tape-cartridge—in particular, from the plurality of tape cartridges in the tape library system—for a write operation having the longest remaining lifetime metric value. If—e.g., for a read operation-multiple copies exist on different magnetic tape cartridges. The just mentioned selection criteria may also be used. A more complex selection criteria as part of this embodiment may specify that the end-of-life indicator value should have a value between 20% and 50%.

According to a more enhanced embodiment of the method, the selection criteria expression may comprise a comparison against a combination of a plurality of tape cartridge lifetime metric values and an end-of-life indicator value against a plurality of related threshold values. An example of this more generalized embodiment may be metric1-value<200 AND metric2-value>50; this would require a selection of the magnetic tape cartridge of a plurality of magnetic cartridges having a lowest number of mount processes and a highest end-of-life indicator value.

According to another advantageous embodiment of the method, the method may be implemented together with one selected from the group consisting of a tape library controller, a tape library operations program or another software program, a tape drive unit, and a dedicated magnetic tape lifetime optimizing system. Generally, the method may be freely implemented and not bound to a specific hardware. However, the implementation may be made in one of the named hardware components without being limited to the selection of hardware components.

According to an optional embodiment of the method, the method may be transparent to an SCSI command receivable by the tape library controller. I.e., the already used command structure does not have to be changed. Hence, the proposed concept may be downward-compatible.

According to another optional embodiment of the method, the parameter values may be receivable from a tape drive unit or a tape library system at an end of a write process to the magnetic tape of the selected magnetic tape cartridge or a read process from the magnetic tape of the selected magnetic tape cartridge. This may use the traditional process of determining and writing the lifecycle parameter values onto the magnetic tape before unmounting it. Hence, sending these values may only be a small addition to the already executed procedural steps before a physical unmount process.

According to an interesting and useful embodiment of the method, the end-of-life indicator value may be derivable from the parameter values. This may be done by a microcode of the tape drive unit. E.g., it may be a function f (a,b,c) resulting in the end-of-life indicator value, where a, b, c may represent lifecycle metric values.

According to an alternative embodiment the method may also comprise using a modified SCSI command for controlling access to the tape library system supporting a selection of the magnetic tape cartridge based on the set of parameters and the selection criteria. The selection criteria may be encoded directly in such a modified SCSI command, and if the number of bits to encode the selection criteria in the novel SCSI mount command is not sufficient then the selection criteria can also be provided in the parameter list—e.g., as pointer—of the modified SCSI command. More details about this are provided in the context of FIG. 4.

Furthermore, embodiments may take the form of a related computer program product, accessible from a computer-usable or computer-readable medium providing program code for use by or in connection with a computer or any instruction execution system by or in connection with a computer or any instruction execution system. For the purpose of this description, a computer-usable or computer-readable medium may be any apparatus that may contain means for storing, communicating, propagating or transporting the program for use by or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments to which the invention is not limited.

Preferred embodiments of the invention will be described, by way of example only, and with reference to the following drawings.

DETAILED DESCRIPTION

In the context of this description, the following technical conventions, terms and/or expressions may be used:

The term 'global lifetime' may denote—in a simple form—the combined, added lifetimes of all existing magnetic tape cartridges in an existing tape library system, i.e., the total lifetime of all magnetic tape cartridges in the tape library system. However, the global lifetime may also go beyond the simple addition of lifetimes of all magnetic tape cartridges in the tape library system. Hence, the global lifetime aims at balancing the lifetimes of all magnetic tape cartridges in the tape library system. Thus, it should be avoided that magnetic tape cartridges need to be replaced prematurely because they have been used too often in a too short amount of a time while other magnetic tape cartridges have not been used at all. In this sense, the optimization of the global lifetime of the magnetic tape cartridges may become equal to extending the global lifetime of the sum of all magnetic tape cartridges in the tape drive system in a balanced way.

The term 'magnetic tape cartridge' may denote a unit comprising a magnetic tape to be inserted into the tape drive unit for reading and writing data from/to the magnetic tape inside the cartridge. The magnetic tape may be housed by a casing, i.e., a box surrounding the wound magnetic tape, wherein the box having an opening to allow a magnetic read/write head to make physical contact with a surface of the magnetic tape.

The term 'tape drive unit' may denote the just mentioned tape drive for reading and writing to magnetic tapes.

The term 'magnetic tape library'—or, alternatively, tape library system—may denote herein a storage device that may comprise one or more tape drives for reading from and writing to magnetic tapes comprised in magnetic tape cartridges. The cartridges may typically be held in a plurality of slots. Furthermore, the magnetic tape cartridges are identifiable, for which purpose a barcode typically may be used. Additionally, a transport mechanism may be provided to transport the cartridges on request from a tape library into one of the tape drives for accessing the information, i.e., a robotic arm or an accessor.

The term 'parameter values' may denote a structured list of values—e.g., in a data record—wherein the parameter values comprise data for a specific predefined purpose, here, the list of lifetime/lifecycle data, a related volume serial number of the respective magnetic tape cartridge, lifetime metric values of the respective magnetic tape cartridge, and an end-of-life-indicator value for each of the magnetic tape cartridges. Thereby, the lifetime metric values may comprise at least one value selected out of the group comprising a number of mount times, a number of bytes read, —a number of bytes written, and a shortest distance the tape has traveled across a read/write-head of any of the drive units. Other and/or additional data may be added.

The term 'volume serial number'—in short or abbreviated 'volser'—may denote a unique identifier, typically expressed using alphanumeric characters. Using this number, each magnetic tape cartridge in the tape library system may uniquely be identifiable. It may be printed on a housing of the cartridge, encoded as barcode or QR code and it may also be stored on the magnetic tape itself.

The term 'end-of-life-indicator value' may denote, e.g., a percentage of an assumed remaining lifetime of a magnetic tape cartridge. If, e.g., the lifetime of the magnetic tape cartridge is set to 10000 mount operations and the magnetic tape cartridge has been mounted already 6000 times, then the end-of-life-indicator value is 60%. I.e., if 100% is reached, the lifetime of the magnetic tape cartridge has been reached and should be replaced after copying the data to a fresh magnetic tape cartridge.

The term 'selection criteria' may denote a regular expression in the form of one or more conditions relating to the parameter values, e.g., a comparison with predefined values, e.g. threshold, values.

In the following, a detailed description of the figures will be given. All instructions in the figures are schematic. Firstly, a block diagram of an embodiment of the inventive computer-implemented method for optimizing a global lifetime for a plurality of magnetic tape cartridges for a magnetic tape library is given. Afterwards, further embodiments, as well as embodiments of the magnetic tape lifetime optimizing system for optimizing a global lifetime for a plurality of magnetic tape cartridges for a magnetic tape library will be described.

Figure 1:
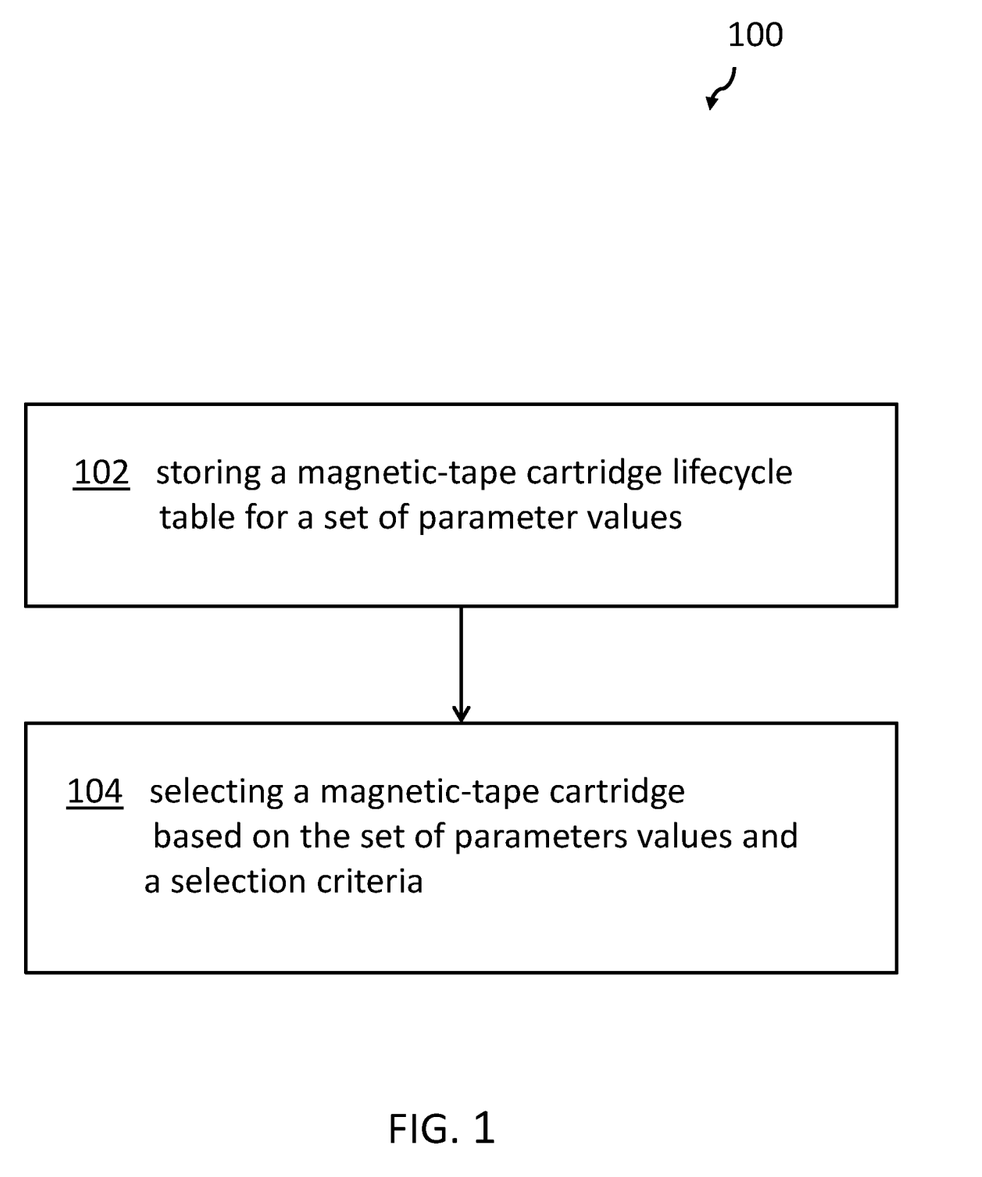
FIG. 1 shows a block diagram of an embodiment of the inventive computer-implemented method for optimizing a global lifetime for a plurality of magnetic tape cartridges for a magnetic tape library.

FIG. 1 shows a block diagram of a preferred embodiment of the computer-implemented method 100 for optimizing a global lifetime—i.e., a combined lifetime of the plurality of magnetic tape cartridges of a tape library system—for a plurality of magnetic tape cartridges for a magnetic tape library. The method comprises storing, 102, a magnetic tape cartridge lifecycle table for a set of parameter values comprising at least volume serial numbers—i.e., "volsers" for a unique identification—of the magnetic tape cartridges (in particular all of them), related lifetime metric values of the magnetic tape cartridges, and respective end-of-life-indicator values—e.g., a percentage value—for each of the magnetic tape cartridges. The values in the magnetic tape cartridge lifecycle table will be updated whenever a magnetic tape cartridge will be used, i.e., whenever it will be unmounted.

Moreover, the method comprises selecting, 104, a magnetic tape cartridge based on the set of parameter values and a selection criteria-which can be a condition and/or an expression—such that the global lifetime of the plurality of the magnetic tape cartridges in the magnetic tape library is optimized.

An example of a magnetic tape cartridge lifecycle table can look like the following table 1:

| volser | lifecycle metric | EoL indicator | Slot |
|---|---|---|---|
| A1234567 | 100 | 50 | 1 |
| B7654321 | 200 | 20 | 2 |
| ... | ... | ... | ... |

In this example, the $1^{st}$ column comprises the volser; in the $2^{nd}$ column, one of a plurality of lifecycle metric values is listed (it could be the number of mounts into a tape drive unit); the $3^{rd}$ column comprises the end-of-life-indicator value (e.g., percentage of the assumed lifetime reached or still usable); and the $4^{th}$, last column comprises a slot number, i.e., a number for a place where the magnetic tape cartridge can be stored in the tape library system if the cartridge is not in use. It should also be mentioned that more lifecycle metric values (or parameter values) can be stored in the table, including a combination of lifecycle metric values (i.e., a result of a function using lifecycle metric values as input).

Figure 2:
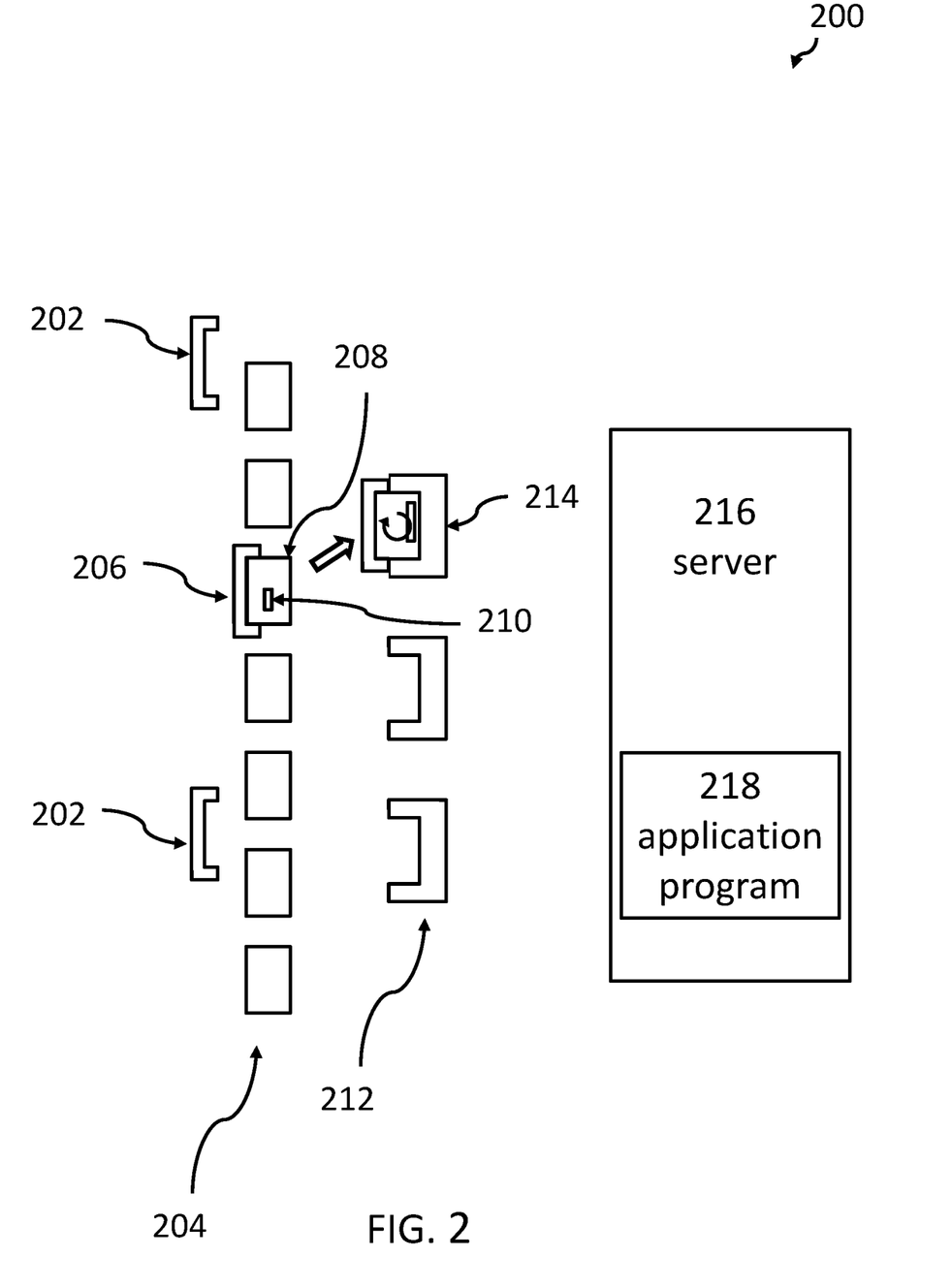
FIG. 2 shows symbolically a tape library system with a plurality of tape drive units, a plurality of magnetic tape cartridges and a plurality of robotic arms.

FIG. 2 shows symbolically a tape library system 200 with a plurality of tape drive units 212, a plurality of magnetic tape cartridges 204 and a plurality of robotic arms or accessors 202. When the data 210, symbolized by the square in the cartridge 208, needs to be read, the accessor (i.e., robotic arm) 206 moves the cartridge 208 into a free drive unit—here symbolized as drive unit 214—so that the drive unit 214 can wind the magnetic tape of the cartridge to the required position to read the requested data.

This may represent the technical/mechanical set-up that is controlled by a tape management application 218 which is hosted by one or more servers 216. An I/O unit (not shown) of the server can transmit a respective command—e.g., in form of a SCSI command—e.g., to the one or more drive units 214, or a controller thereof which may also control the functioning of the robotic arm, i.e., the accessor(s) 202.

Figure 3:
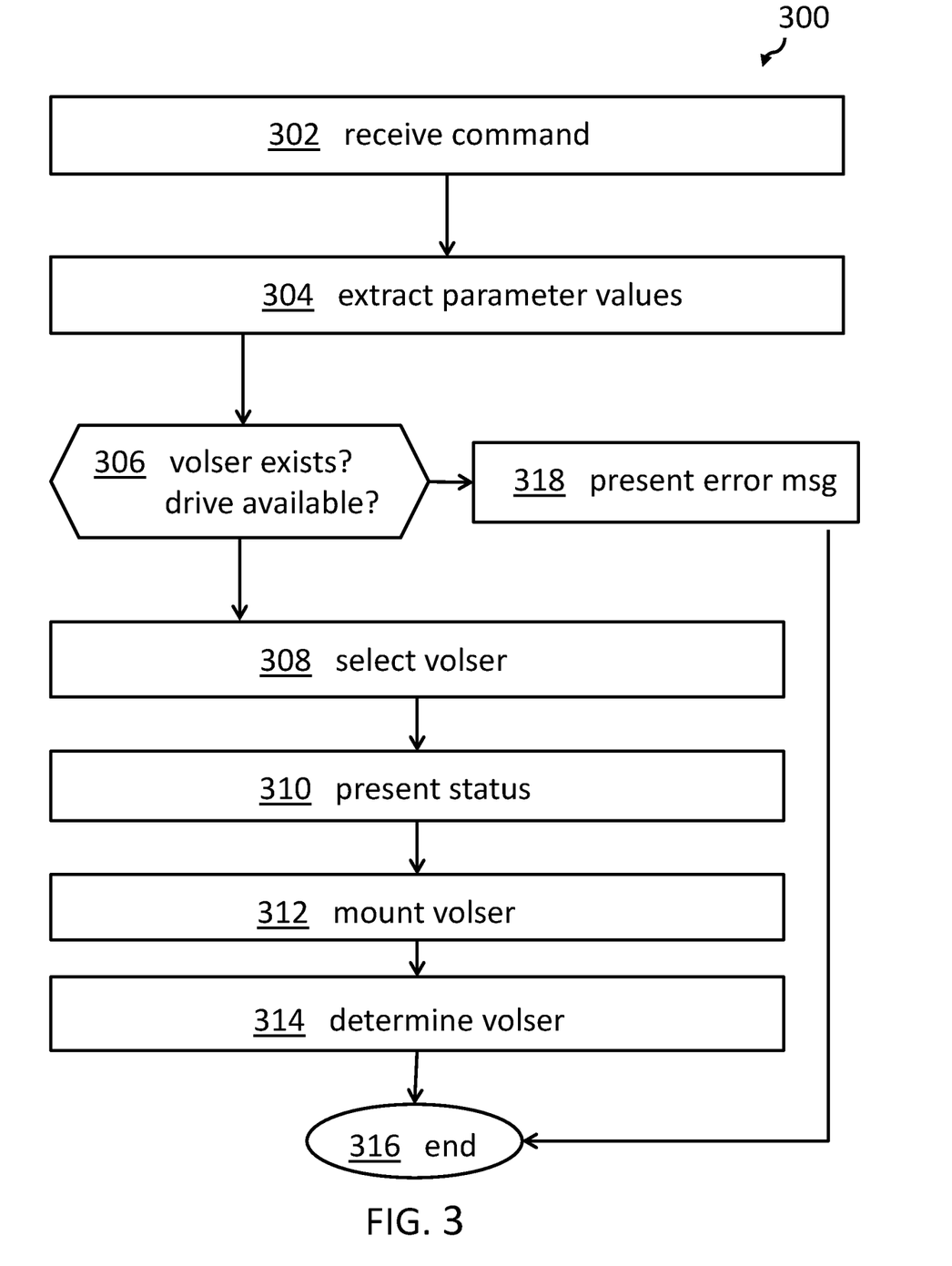
FIG. 3 shows a more detailed flowchart of a process implementing the proposed method.

FIG. 3 shows a more detailed flowchart 300 of a process implementing the proposed method. This embodiment also assumes that the process is implemented as part of the library controller. If, on the other side, the method would be implemented by a software program or controller outside the tape library system, the SCSI command may be dispensable.

The process according to the flowchart 300 allows a balanced mount processing based on lifecycle and metric values and an end-of-life indicator value of magnetic tape cartridges. The process starts by sending a novel SCSI mount command to the tape library system, and more precisely, to the related controller, where it is received, in step 302. Subsequently, the mount command is sent to the tape drive unit and addressed to the library controller. The tape drive unit passes the command on to the library controller via the library drive interface. Here, the parameter values are extracted, in step 304, namely, the list of magnetic tape cartridges selected by the controlling application, the element address of the tape drive unit, where the selected magnetic tape cartridge must be mounted and the selection criteria for the magnetic tape cartridge must be applied.

Then, it is checked, in step 306, by the library controller if the magnetic tape cartridge IDs (volsers) provided in the parameter list exist and if the tape drive address provided in the parameter list is available. If this is not the case—case "N"—then the library controller presents, 318, an error/error message to the calling application; then, the process ends, 316.

If at least one of the volsers exists and the drive is available—case "Y" in step 306—the library controller selects, in step 308, one magnetic tape cartridge volser provided with the modified SCSI mount command in accordance with the selection criteria provided by the modified SCSI command.

Thereby, the library controller selects all rows in the tape cartridge lifecycle table (see above, table 1) that match the volser(s) extracted in step 304. Then, the library controller matches the selection criteria extracted in step 304 to column 2 and 3 of the table and selects the first volser matching the criteria. For example, again referring to table 1 above, if the volser lists comprises volser A1234567 and B7654321 and the selection criteria is the highest EoL (end-of-life) indicator, then the process selects volser A12345672 (compare column 1 and column 3 of the table).

In step 310, the library controller presents a status to the command received in step 302, indicating the volser selection has finished. In step 312, the library controller determines the slot address from the tape cartridge lifecycle table (column 4 in the table) of step 308 (column 1 in the table). The library controller then orders the robot arm of the tape library system to move the selected cartridge with the identified volser from the selected slot to the tape drive unit slot that was provided with a modified SCSI command in step 304.

Next, in step 314, "the controlling application reads" the tape cartridge that was selected and mounted by the library controller in the tape drive unit to determine (at step 314) the volser of the mounted magnetic tape cartridge. The volser is typically encoded in a record that is written to the beginning of the magnetic tape (header label). Alternatively, the controlling application sends a READ ELEMENT STATUS command (an SCSI command) to the library controller to determine the volser of the magnetic tape mounted in the tape drive unit.

Finally, the process ends, in step 316. At this point in time, the application has control over the mount processing in accordance with traditional technology. The application polls the tape drive unit to get ready and then writes (or reads) data to (from) the magnetic tape of the cartridge.

When the magnetic tape cartridge is unmounted from the tape drive unit, then the library controller is notified about the process by the tape drive unit via the library drive interface. Upon an unmount command, the library controller instructs the tape drive unit to provide the tape cartridge lifecycle metric values and EoL indicators to the library controller. The tape drive units keeps track about these values and indicators during the tape operations and stores these metric values on the magnetic tape cartridge itself. Upon reception of the indicators and metric values, the tape library controller updates the tape cartridge lifecycle table (compare table 1, above). For the row where column 1 matches the volser of the magnetic tape cartridge, the magnetic tape cartridge is unloaded from the respective tape drive unit.

Finally, after updating the tape cartridge lifecycle table, the library controller instructs the robotic arm to move the magnetic tape cartridge from the tape drive unit slot to the predefined home slot address of the magnetic tape cartridge.

Figure 4:
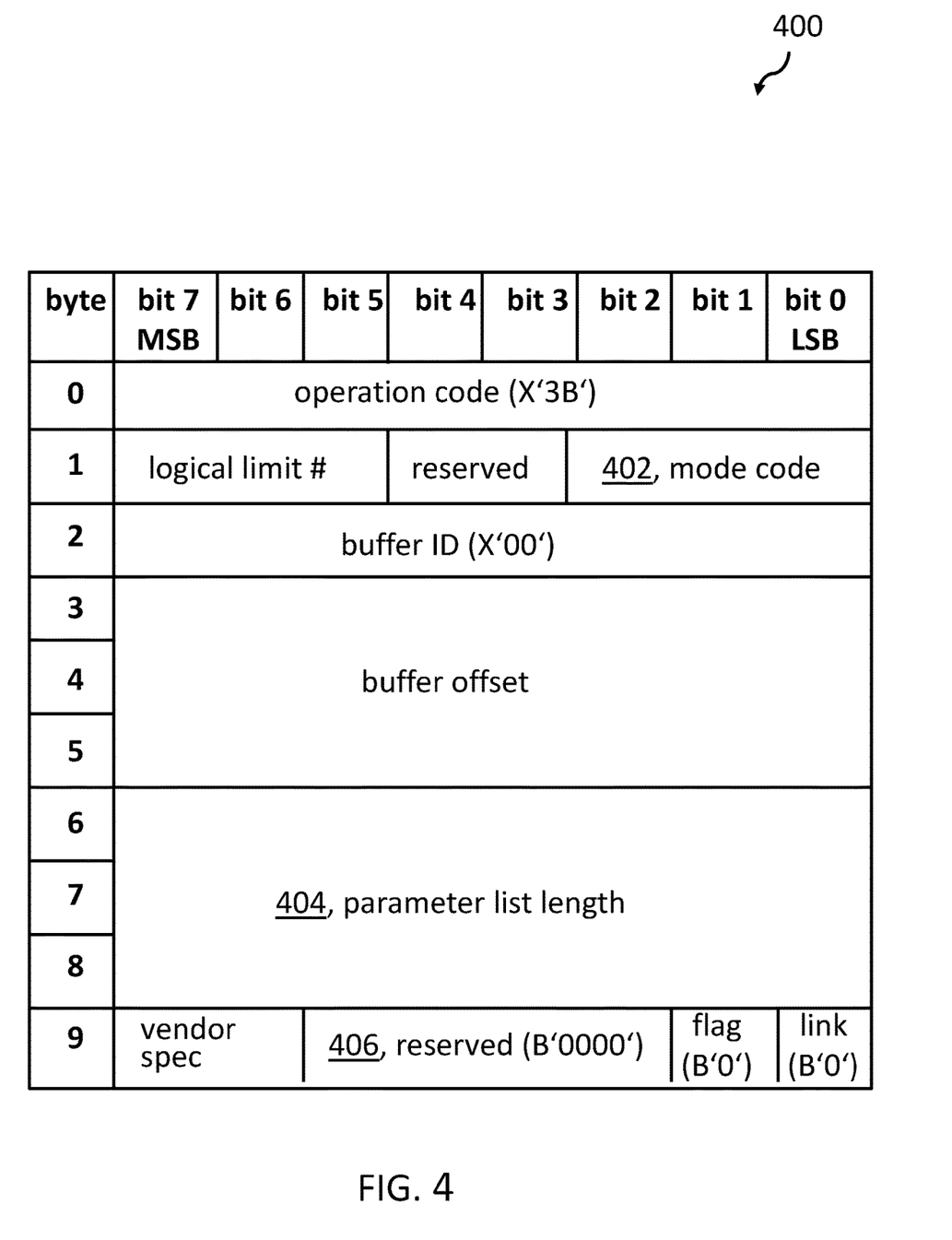
FIG. 4 shows a structure of a modified SCSI mount command used in conjunction with the proposed concept.

FIG. 4 shows a structure 400 of a modified SCSI mount command. With this SCSI mount command, the controlling application of the tape library system sends a list of magnetic tape cartridge IDs by their volser or slot, a selection criteria, and a destination element address to the library controller, e.g., via a network interface. Upon reception of this command, the library controller applies the selection criteria to the list of the magnetic tape cartridge ID to select a unique magnetic tape cartridge ID and moves this magnetic tape cartridge to the destination element address which may be an element address of the tape drive unit.

The modified SCSI mount command can be based on the existing and known "write buffer" command. As can be seen from the figure, this command is followed by a parameter list with a specified list length.

This modified SCSI mount command modifies the existing Write Buffer command (i.e., X'3B') of the group of tape library system commands (in contrast to the tape drive unit SCSI command group) as follows:
- the logical unit number in byte 1, bits 5-7 is set to 0x1 indicating the medium change unit number;
- the mode code 402 in byte 1, bits 1-2 may be set to 0x0 indicating the modified SCSI mount command mode; here, the modification of the standard SCSI Write Buffer commands is manifested; using the bit combination of the modified SCSI mount command, the meaning of the also modified bytes 3-8 of the Write Buffer command X'3B' is defined;
- the parameter list length 404 in bytes 6-8 comprises the number of bytes transferred in the parameter list;
- the reserved field 406 in byte 9, bits 2-5 comprises the selection criteria; the following encoding may be used within these 4 bits:
  0x0: default criteria,
  0x1: lowest number of mounts,
  0x2: lowest number of bytes read or written,
  0x3: shortest distance the tape has traveled across the head,
  0x4; the highest media end-of-life indicator value.
- besides these selection criteria, more criteria can be defined, and they also can be combined as logical expression or combined condition.

The parameter value list is transferred subsequently to the SCSI Write Buffer command. The parameter value list comprises the list of tape cartridge IDs subject to the selection. When using the slot number to identify magnetic tape cartridge IDs, each magnetic tape cartridge requires two bytes in the parameter list. The last two bytes in the parameter list include the destination element address were the selected magnetic tape cartridge ID is moved to. The number of magnetic tape cartridge IDs in the list and the two bytes used for the destination element address can be translated into the number of parameter list length 404.

Furthermore, the selection criteria that can be provided by the tape library system controlling application to select the magnetic tape cartridge denoted by its volser, are predefined in the library controller if the section criteria are not included in the modified SCSI mount command (compare 406 in FIG. 4). The selection criteria can also be a combination of multiple logical connected selection criteria, e.g.: lowest number of mounts and the highest end-of-life indicator value for the specific media. This logical connection can be provided by the application with a modified SCSI mount command.

In a further embodiment, also a default selection criteria can be used, in case the application does not specify a selection criteria. Additionally, and in an alternative embodiment if the number of bits to encode the selection criteria 406 in the modified SCSI mount command is not sufficient, then the selection criteria can also be provided in the parameter list. Hence, the modified SCSI command may also be understood as an existing SCSI WRITE BUFFER command which may be interpreted in a modified manner compared to a traditional use of the field in the command.

Figure 5:
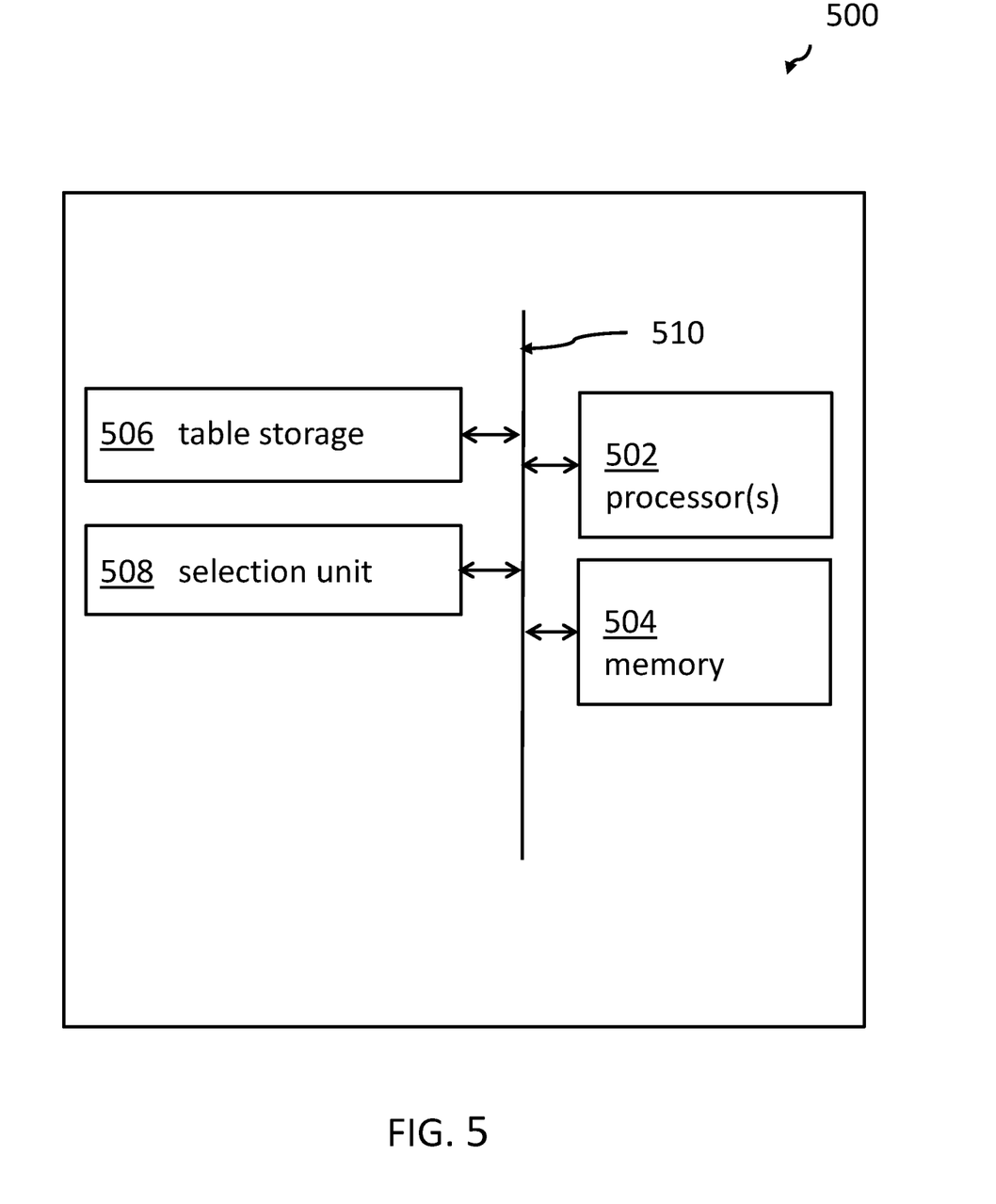
FIG. 5 shows a block diagram of an embodiment of the inventive magnetic tape lifetime optimizing system for optimizing a global lifetime for a plurality of magnetic tape cartridges for a magnetic tape library.

FIG. 5 shows a block diagram of an embodiment of the magnetic tape lifetime optimizing system 500 for optimizing a global lifetime for a plurality of magnetic tape cartridges for a magnetic tape library. The system comprises one or more processors and a memory operatively coupled to the one or more processors, wherein the memory stores program code portions which, when executed by the one or more processors, enable the one or more processors to store a magnetic tape cartridge lifecycle table—in particular a table storage 506—for a set of parameter values. These parameter values comprise at least volume serial numbers of the magnetic tape cartridges, related lifetime metric values of the magnetic tape cartridges and respective end-of-life-indicator values for each of the magnetic tape cartridges.

The one or more processors are enabled to select—in particular, by a selection unit 508—a magnetic tape cartridge based on the set of parameter values and a selection criteria such that the global lifetime of the plurality of the magnetic tape cartridges in the magnetic tape library is optimized.

It shall also be mentioned that all functional units, modules and functional blocks—in particular, at least the one or more processors 502, the memory 504, the table storage 506 (which may in parts be integrated into the memory 504) and the selection unit 508—may be communicatively coupled to each other for signal or message exchange in a selected 1:1 manner. Alternatively the functional units, modules and functional blocks can be linked to an internal bus system 510 for a selective signal or message exchange.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
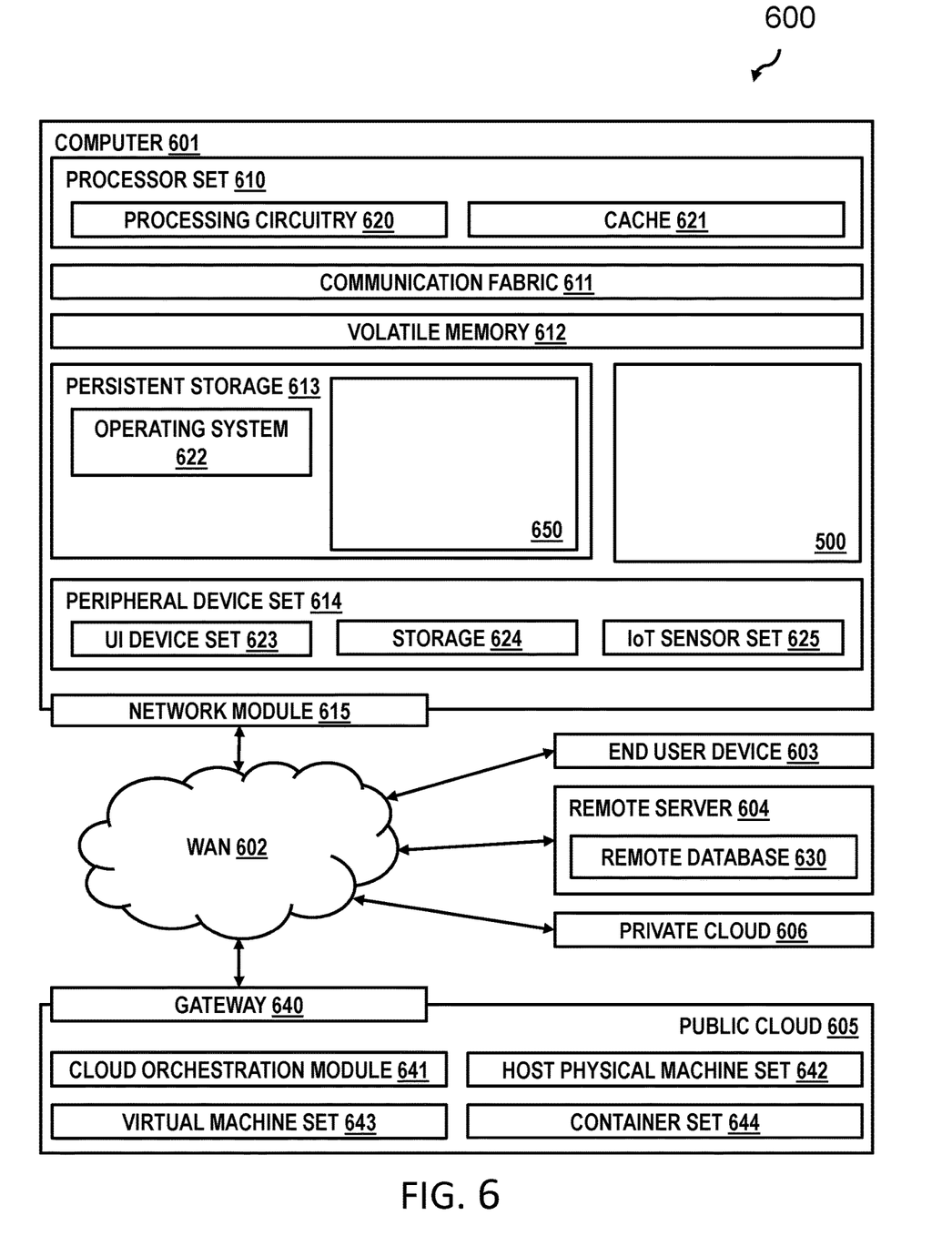
FIG. 6 shows an embodiment of a computing system comprising the system according to FIG. 5.

FIG. 6 shows a computing environment 600 comprising an example of an environment for the execution of at least some of the computer code involved in performing the inventive methods, such as the computer-implemented method for optimizing a global lifetime for a plurality of magnetic tape cartridges for a magnetic tape library 650.

In addition to block 650, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 650, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer—implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 650 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in block 650 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (e.g., embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

It should also be mentioned that the magnetic tape lifetime optimizing system 500 (compare FIG. 5) for optimizing a global lifetime for a plurality of magnetic tape cartridges for a magnetic tape library can be an operational sub-system of the computer 601 and may be attached to a computer-internal bus system.

The terminology used herein is for the purpose of describing particular embodiments only and is not intended to limit the invention. As used herein, the singular forms "a," "an," and "the" are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The inventive concept may be summarized by the following clauses:

1. A computer-implemented method for extending a global lifetime for a plurality of magnetic tape cartridges for a magnetic tape library, said method comprising:
   storing a magnetic tape cartridge lifecycle table for a set of parameter values comprising:
      volume serial numbers of said magnetic tape cartridges,
      lifetime metric values of said magnetic tape cartridges, and
      end-of-life-indicator values for each of said magnetic tape cartridges; and
   selecting a magnetic tape cartridge based on said set of parameter values and a selection criteria such that the global lifetime of said plurality of said magnetic tape cartridges in said magnetic tape library is optimized.

2. The method according to clause 1, wherein said lifetime metric values comprise at least one value selected from the group comprising:
   a number of mount times,
   a number of bytes read,
   a number of bytes written, and
   a shortest distance said tape has traveled across a read/write-head of any of said drive units.

3. The method according to clause 1, wherein said selection criteria comprises a condition or an expression further specifying said selection criteria.

4. The method according to clause 3, wherein a selection criteria expression comprises a comparison of a single tape cartridge lifetime metric value and/or an end-of-life indicator value against threshold values.

5. The method according to clause 3, wherein a selection criteria expression comprises a comparison against a combination of a plurality of tape cartridge lifetime metric values and an end-of-life indicator value against a plurality of related threshold values.

6. The method according to clause 1, wherein said method is implementable together with at least one element selected from the group comprising:
   a tape library controller,
   a tape library operations program or another software program,
   a tape drive unit, and
   a dedicated magnetic tape lifetime optimizing system.

7. The method according to clause 1, wherein said method is transparent to an SCSI command receivable by a tape library controller.

8. The method according to clause 1, wherein said set of parameter values are receivable from a tape drive unit or a tape library system at an end of a write process to said magnetic tape of said selected magnetic tape cartridge or a read process from said magnetic tape of said selected magnetic tape cartridge.

9. The method according to clause 1, wherein said end-of-life indicator values are derivable from said parameter values.

10. The method according to clause 1, further comprising:
    using a modified SCSI command for controlling access to said tape library system supporting a selection of said magnetic tape cartridge based on said set of parameters and said selection criteria.

11. A magnetic tape lifetime optimizing system for extending a global lifetime for a plurality of magnetic tape cartridges for a magnetic tape library, said system comprising:
    one or more processors and a memory operatively coupled to said one or more processors, wherein said memory stores program code portions which, when executed by said one or more processors, enable said one or more processors to:
    store a magnetic tape cartridge lifecycle table for a set of parameter values comprising:
       volume serial numbers of said magnetic tape cartridges,
       lifetime metric values of said magnetic tape cartridges, and
       end-of-life-indicator values for each of said magnetic tape cartridges; and
    select a magnetic tape cartridge based on said set of parameter values and a selection criteria such that said global lifetime of said plurality of said magnetic tape cartridges in said magnetic tape library is optimized.

12. The system according to clause 11, wherein said lifetime metric values comprise at least one value selected from the group comprising:
    a number of mount times,
    a number of bytes read,
    a number of bytes written, and
    a shortest distance said tape has traveled across a read/write-head of any of said drive units.

13. The system according to clause 11, wherein said selection criteria comprises a condition or an expression further specifying said selection criteria.

14. The system according to clause 13, wherein a selection criteria expression comprises a comparison of a single tape cartridge lifetime metric value and/or said end-of-life indicator value against threshold values.

15. The system according to clause 13, wherein a selection criteria expression comprises a comparison against a combination of a plurality of tape cartridge lifetime metric values and said end-of-life indicator value against a plurality of related threshold values.

16. The system according to clause 11, wherein said system is implementable together with at least one element selected from the group comprising:
    a tape library controller,
    a tape library operations program or another software program, a tape drive unit, and
a dedicated magnetic tape lifetime optimizing system.

17. The system according to clause 11, wherein said system is transparent to an SCSI command receivable by a tape library controller.

18. The system according to clause 11, wherein said set of parameter values are receivable from a tape drive unit or a tape library system at an end of a write process to said magnetic tape of said selected magnetic tape cartridge or a read process from said magnetic tape of said selected magnetic tape cartridge.

19. The system according to clause 11, wherein said one or more processors are further enabled to:
use a modified SCSI command for controlling access to said tape library system supporting a selection of said magnetic tape cartridge based on said set of parameters and said selection criteria.

20. A computer program product for extending a global lifetime for a plurality of magnetic tape cartridges for a magnetic tape library, said computer program product comprising a computer readable storage medium having program instructions embodied therewith, said program instructions being executable by one or more computing systems or controllers to cause said one or more computing systems to:
store a magnetic tape cartridge lifecycle table for a set of parameter values comprising:
volume serial numbers of said magnetic tape cartridges,
lifetime metric values of said magnetic tape cartridges, and
end-of-life-indicator values for each of said magnetic tape cartridges; and
select a magnetic tape cartridge based on said set of parameter values and a selection criteria such that said global lifetime of said plurality of said magnetic tape cartridges in said magnetic tape library is optimized.

What is claimed is:

1. A computer-implemented method for optimizing a global lifetime for a plurality of magnetic tape cartridges for a magnetic tape library, the method comprising:
storing a magnetic tape cartridge lifecycle table for a set of parameter values, the set of parameter values including: volume serial numbers of a plurality of magnetic tape cartridges, lifetime metric values of the plurality of magnetic tape cartridges, and end-of-life-indicator values for the plurality of magnetic tape cartridges, wherein an end-of-life indicator value for a magnetic tape cartridge is a remaining lifetime of the magnetic tape cartridge indicative of when the magnetic tape cartridge in the magnetic tape library should be replaced with a new magnetic tape cartridge; and
selecting a first magnetic tape cartridge from the plurality of magnetic tape cartridges based on the set of parameter values and a selection criteria, wherein the selection of the first magnetic tape cartridge optimizes the global lifetime of the plurality of magnetic tape cartridges in the magnetic tape library.

2. The computer-implemented method of claim 1, wherein the lifetime metric values include at least one value selected from the group comprising: a number of mount times, a number of bytes read, a number of bytes written, and a shortest distance a tape has traveled across a read/write-head of a drive unit.

3. The computer-implemented method of claim 1, wherein the selection criteria includes a condition or an expression further specifying the selection criteria.

4. The computer-implemented method of claim 3, wherein a selection criteria expression includes at least one of a comparison of a single tape cartridge lifetime metric value or an end-of-life indicator value against threshold values.

5. The computer-implemented method of claim 3, wherein a selection criteria expression includes a comparison against a combination of a plurality of tape cartridge lifetime metric values, and an end-of-life indicator value against a plurality of related threshold values.

6. The computer-implemented method of claim 1, wherein the method is implementable together with at least one element selected from the group comprising: a tape library controller, a tape library operations program or another software program, a tape drive unit, and a dedicated magnetic tape lifetime optimizing system.

7. The computer-implemented method of claim 1, wherein the method is transparent to an SCSI command receivable by a tape library controller.

8. The computer-implemented method of claim 1, wherein the set of parameter values are receivable from either a tape drive unit or a tape library system at an end of a write process to the selected first magnetic tape cartridge or a read process from the selected first magnetic tape cartridge.

9. The computer-implemented method of claim 1, wherein the end-of-life indicator values are derivable from the set of parameter values.

10. The computer-implemented method of claim 1, further comprising:
using a modified SCSI command for controlling access to the magnetic tape library to select the first magnetic tape cartridge based on the set of parameters and the selection criteria.

11. A magnetic tape lifetime optimizing system for optimizing a global lifetime for a plurality of magnetic tape cartridges for a magnetic tape library, the system comprising:
one or more processors and a memory operatively coupled to the one or more processors, wherein the memory stores program instructions which, when executed by the one or more processors, enable the one or more processors to:
store a magnetic tape cartridge lifecycle table for a set of parameter values, the set of parameter values including: volume serial numbers of a plurality of magnetic tape cartridges, lifetime metric values of the plurality of magnetic tape cartridges, and end-of-life-indicator values for the plurality of magnetic tape cartridges, wherein an end-of-life indicator value for a magnetic tape cartridge is a remaining lifetime of the magnetic tape cartridge indicative of when the magnetic tape cartridge in the magnetic tape library should be replaced with a new magnetic tape cartridge; and
select a first magnetic tape cartridge from the plurality of magnetic tape cartridges based on the set of parameter values and a selection criteria, wherein the selection of the magnetic tape cartridge optimizes the global lifetime of the plurality of magnetic tape cartridges in the magnetic tape library.

12. The system of claim 11, wherein the lifetime metric values include at least one value selected from the group comprising: a number of mount times, a number of bytes read, a number of bytes written, and a shortest distance a tape has traveled across a read/write-head of a drive unit.

13. The system of claim 11, wherein the selection criteria includes a condition or an expression further specifying the selection criteria.

14. The system of claim 13, wherein a selection criteria expression includes at least one of a comparison of a single tape cartridge lifetime metric value or an end-of-life indicator value against threshold values.

15. The system of claim 13, wherein a selection criteria expression includes a comparison against a combination of a plurality of tape cartridge lifetime metric values, and an end-of-life indicator value against a plurality of related threshold values.

16. The system of claim 11, wherein the system is implementable together with at least one element selected from the group comprising: a tape library controller, a tape library operations program or another software program, a tape drive unit, and a dedicated magnetic tape lifetime optimizing system.

17. The system of claim 11, wherein the system is transparent to an SCSI command receivable by a tape library controller.

18. The system of claim 11, wherein the set of parameter values are receivable from either a tape drive unit or a tape library system at an end of a write process to the selected first magnetic tape cartridge or a read process from the selected first magnetic tape cartridge.

19. The system of claim 11, wherein the program instructions further enable the one or more processors to:
use a modified SCSI command for controlling access to the magnetic tape library to select the first magnetic tape cartridge based on the set of parameters and the selection criteria.

20. A computer program product for optimizing a global lifetime for a plurality of magnetic tape cartridges for a magnetic tape library, the computer program product comprising a computer readable storage medium having program instructions embodied therewith, the program instructions comprising instructions to:
store a magnetic tape cartridge lifecycle table for a set of parameter values, the set of parameter values including: volume serial numbers of a plurality of magnetic tape cartridges, lifetime metric values of the plurality of magnetic tape cartridges, and end-of-life-indicator values for the plurality of magnetic tape cartridges, wherein an end-of-life indicator value for a magnetic tape cartridge is a remaining lifetime of the magnetic tape cartridge indicative of when the magnetic tape cartridge in the magnetic tape library should be replaced with a new magnetic tape cartridge; and
select a magnetic tape cartridge from the plurality of magnetic tape cartridges based on the set of parameter values and a selection criteria, wherein the selection of the magnetic tape cartridge optimizes the global lifetime of the plurality of magnetic tape cartridges in the magnetic tape library.

* * * * *